US012618354B2

(12) United States Patent
Bagga et al.

(10) Patent No.: US 12,618,354 B2
(45) Date of Patent: May 5, 2026

(54) METHOD AND SYSTEM FOR DETECTING AND QUANTIFYING REGENERATION EVENTS IN A DIESEL PARTICULATE FILTER

(71) Applicant: Intangles Lab Pvt. Ltd., Maharashtra (IN)

(72) Inventors: Harleen Kaur Bagga, Bhopal (IN); Bhushan Dayaram Patil, Pune (IN); Abhijit Vishwas Patil, Bengaluru (IN); Hariharan Ravishankar, Bengaluru (IN); Vikram Reddy Melapudi, Bengaluru (IN); Nikhil Gore, Thane (IN); Nishant Srivastava, Ghaziabad (IN); Ruchika Sharma, New Delhi (IN); Aman Singh, Pune (IN)

(73) Assignee: Intangles Lab Pvt. Ltd., Maharashtra (IN)

( * ) Notice: Subject to any disclaimer, the term of this patent is extended or adjusted under 35 U.S.C. 154(b) by 105 days.

(21) Appl. No.: 18/590,794

(22) Filed: Feb. 28, 2024

(65) Prior Publication Data

US 2025/0270950 A1 Aug. 28, 2025

(51) Int. Cl.
| | |
|---|---|
| *F01N 11/00* | (2006.01) |
| *B01D 46/44* | (2006.01) |
| *B01D 46/46* | (2006.01) |
| *B01D 46/84* | (2022.01) |
| *F01N 3/023* | (2006.01) |
| *G01N 15/08* | (2006.01) |

(52) U.S. Cl.
CPC ............ *F01N 11/00* (2013.01); *B01D 46/444* (2013.01); *B01D 46/446* (2013.01); *B01D 46/448* (2013.01); *B01D 46/46* (2013.01);

*B01D 46/84* (2022.01); *F01N 3/023* (2013.01); *G01N 15/0826* (2013.01); *B01D 2279/30* (2013.01); *F01N 2550/04* (2013.01); *G01N 2015/084* (2013.01)

(58) Field of Classification Search
CPC ...... F01N 11/00; F01N 3/023; F01N 2550/04; B01D 46/444; B01D 46/446; B01D 46/448; B01D 46/46; B01D 46/84; B01D 2279/30; G01N 15/0826; G01N 2015/084
See application file for complete search history.

(56) References Cited

U.S. PATENT DOCUMENTS

| | | | |
|---|---|---|---|
| 2008/0163609 A1* | 7/2008 | Satou ...................... | F01N 9/002 60/287 |
| 2012/0204542 A1* | 8/2012 | Norris ................... | F01N 13/011 60/287 |

(Continued)

*Primary Examiner* — Brandon D Lee
(74) *Attorney, Agent, or Firm* — Dennemeyer & Associates LLC

(57) ABSTRACT

Methods and Systems are provided for detecting and quantifying regeneration events for diesel particulate filters in diesel engines. Parameters such as exhaust temperature, DPF differential pressure, and mass flow rates received from an engine management system are checked to determine if a regeneration is detected. If a regeneration event is detected, DPF differential pressures are logged and identified as pre-event differential pressures or post-event differential pressures. A soot burn quality value is determined using the pre-event and post-event differential pressures. The soot burn quality is used to score the soot burn and to generate alerts.

20 Claims, 11 Drawing Sheets

(56)                    References Cited

U.S. PATENT DOCUMENTS

| | | | |
|---|---|---|---|
| 2012/0311994 A1* | 12/2012 | Kowalkowski | F01N 11/00 |
| | | | 60/277 |
| 2018/0095059 A1* | 4/2018 | McQuillen | G01S 15/931 |
| 2019/0390588 A1* | 12/2019 | Inoue | F01N 9/002 |
| 2020/0217235 A1* | 7/2020 | Kobashi | B01D 46/448 |
| 2022/0054966 A1* | 2/2022 | Varughese | B60H 1/008 |

* cited by examiner

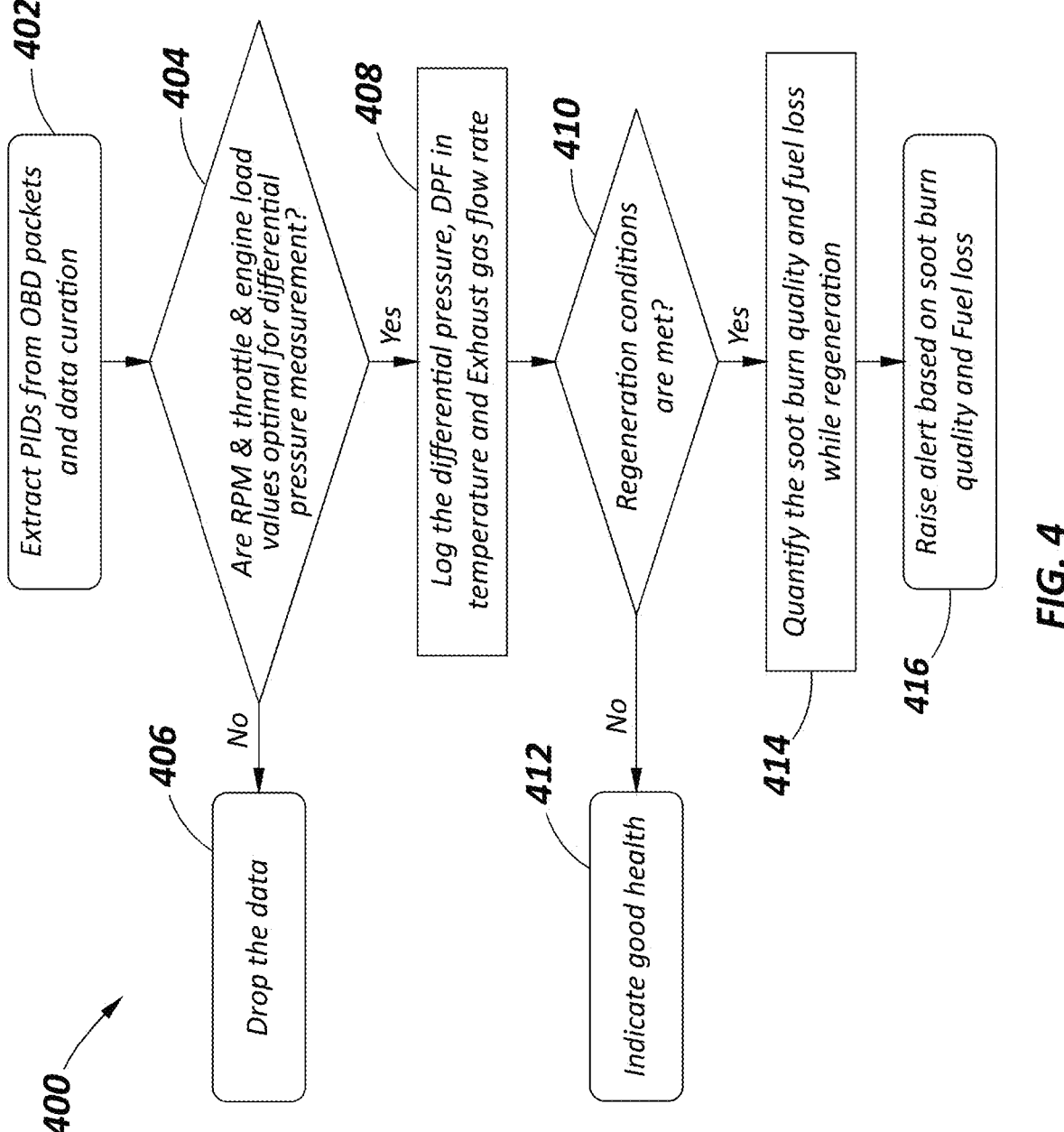

*402* Extract PIDs from OBD packets and data curation

*404* Are RPM & throttle & engine load values optimal for differential pressure measurement?

*406* Drop the data (No)

*408* Log the differential pressure, DPF in temperature and Exhaust gas flow rate (Yes)

*410* Regeneration conditions are met?

*412* Indicate good health (No)

*414* Quantify the soot burn quality and fuel loss while regeneration (Yes)

*416* Raise alert based on soot burn quality and Fuel loss

METHOD AND SYSTEM FOR DETECTING AND QUANTIFYING REGENERATION EVENTS IN A DIESEL PARTICULATE FILTER

BACKGROUND

This disclosure relates generally to diesel engines and more particularly to diesel particulate filter regeneration analysis.

Diesel engines are typically equipped with a diesel particulate filter (DPF) in the exhaust systems. The DPF is a filter that captures and stores exhaust soot in order to reduce harmful emissions from diesel vehicles. DPFs are disposed in line with the exhaust path of the diesel engine to trap al of the soot from the engine.

DPFs have a finite capacity for the volume of soot that can it can trap. A process called regeneration or soot oxidation or soot burn can be performed to burn-off or empty the trapped soot. A regeneration generally entails running the engine at a high load in order to increase the engine temperature enough to burn off the excess soot trapped in the DPF.

A regeneration may be performed in the following ways:

Passive Regeneration: Soot is burned off from the DPF without engine control unit ("ECU") intervention, typically occurring at higher engine loads.

Active Regeneration: When the ECU actively increases exhaust temperature (500-650° C.) to burn off soot. Active regeneration may be viewed as a process initiated by the engine to ensure that the DPF is cleaned. Regeneration may be initiated based on a threshold differential pressure, a threshold soot load, or periodically.

Parked Regeneration: Drivers can initiate parked regeneration by parking the vehicle and engaging a switch, causing the engine to rev up and increase exhaust temperature to burn off soot.

Forced Regeneration: Technicians at a shop can perform forced regeneration by connecting to the vehicle via a laptop/diagnostic tool.

Forced, active and parked regenerations may be initiated by the ECU by controlling engine parameters expected to increase the engine temperature. Such parameters include, for example, engine speed or engine load. In some cases, the ECU may initiate a process in which fuel is injected into the DPF structure to increase the burn temperature. Regeneration is most efficiently performed at temperatures between about 500° and 650° C. Passive regenerations and even active regenerations may not always achieve the right temperature and other factors may affect the quality of soot burns. This can result in uncertainty in the remaining effectiveness of the DPF in any given diesel engine.

As diesel engines age, the regeneration process becomes less and less effective. It may not be possible to completely burn off all of the soot in any given regeneration either because it has accumulated over time, or because the quality of individual soot burns are not consistently good, which may be due to an inability to consistently reach a sufficiently high engine temperature.

An aging DPF may result in a loss of fuel efficiency, engine power, and overall engine performance as the DPF becomes more and more clogged. While regeneration events may extend the life of the DPF, there is currently no way to monitor the effectiveness of the regeneration process over the life of the engine.

SUMMARY

In example implementations described in this disclosure, systems and methods are provided for detecting and quantifying regeneration in a diesel particulate filter configured to trap particulates in engine exhaust gas. In example implementations, the system includes a data interface configured to receive engine data from an engine management system configured to receive a plurality of parameters from sensors that monitor the parameters indicative of engine operation. The parameters include differential pressure across the diesel particulate filter (DPF differential pressure), exhaust temperature, and mass flow rate. A diesel particulate filter diagnostic system ("DPF diagnostic system") is included and stored as computer programs in a memory system. A processor executes the computer programs of the DPF diagnostic system, where when executed the DPF diagnostic system:

receives and stores a plurality of DPF differential pressure measurements, engine speed, and engine load read by the engine management system periodically;

detects a regeneration event when the exhaust temperature is greater than a regeneration temperature threshold and the mass flow rate is greater than a regeneration gas flow, where at least one DPF differential pressure measurement stored before detection of the regeneration event is stored as a pre-event differential pressure;

stores at least one DPF differential pressure measurement received after completion of the regeneration event as a post-event differential pressure;

calculates a differential pressure by subtracting the post-event differential pressure from the pre-event differential pressure;

calculates a soot burn quality=[(pre-event differential pressure−post-event differential pressure)/pre-event differential pressure]×100%;

scores the soot burn quality based on predetermined threshold levels; and outputs a DPF status based on the score.

In one aspect, the scoring of the soot burn quality includes determining:

a bad soot burn for a soot burn quality <BAD_THRESHOLD, a medium soot burn for a soot burn quality >=BAD_THRESHOLD and <GOOD_THRESHOLD, AND a good soot burn for a soot burn quality >=GOOD_THRESHOLD.

In one aspect, the DPF diagnostic system generates an alert indicative of the soot burn quality, where the alert may indicate a major or a minor issue.

In another aspect, when the bad soot burn quality is a bad soot burn or medium soot burn, a major issue alert is generated when the post-event differential pressure is greater than a HIGH POST-EVENT DIFFERENTIAL PRESSURE THRESHOLD.

In another aspect, when the soot burn quality is bad soot burn, and the post-event differential pressure is between a LOW POST-EVENT DIFFERENTIAL PRESSURE THRESHOLD and the HIGH POST-EVENT DIFFERENTIAL PRESSURE THRESHOLD, a minor issue alert is generated.

In another aspect, in detecting the regeneration event, the DPF diagnostic system determines a passive event time during which the regeneration temperature and mass flow rate are indicative of the regeneration event; and stores the pre-event differential pressure and the post-event differential pressure for the passive regeneration event when the passive event time is greater than a predetermined passive regeneration event threshold time.

In another aspect, a regeneration event trigger mechanism initiates a non-passive regeneration event, where the DPF diagnostic system sends a regeneration event initiation request to the engine management system to increase exhaust temperature and engine revolutions/minute (RPM) sufficient to generate conditions for a non-passive regeneration event.

In another aspect, the DPF diagnostic system stores for each regeneration event a regeneration event data set comprising the differential pressure, the soot burn quality, the soot burn score, and the exhaust temperature during the regeneration event. A regeneration event sequence comprising the regeneration event data sets for each regeneration event in a time period is stored and each regeneration event data set is time-stamped.

In another aspect, the DPF diagnostic system stores a clean state differential pressure determined in a clean regeneration event when the DPF is in a known clean state. A soot burn load is calculated for each regeneration event by subtracting the differential pressure calculated at each regeneration event from the clean state differential pressure.

In another aspect, the DPF diagnostic system compares the differential pressure to a VALID EVENT THRESHOLD and indicates a failed regeneration when the differential pressure is less than the VALID EVENT THRESHOLD.

In another aspect, the DPF diagnostic system calculates a pre-event fuel consumption before the regeneration event; calculates a fuel consumption during the regeneration event; and indicates the fuel consumption during regeneration as a fuel loss when the DPF diagnostic system indicates a failed regeneration, or indicates the fuel consumption as a fuel efficiency improvement when the DPF diagnostic system does not indicate a failed regeneration.

In another aspect, the DPF diagnostic system triggers a non-passive regeneration event by requesting an exhaust temperature increase, where the exhaust temperature increase is initiated by injecting fuel into the DPF; and adds a fuel consumption to trigger the regeneration event to the fuel consumption during regeneration event before determining fuel loss or fuel efficiency improvement.

BRIEF DESCRIPTION OF THE FIGURES

FIG. 4 is a flow chart illustrating operation of an example method for detecting and quantifying a regeneration event.

DETAILED DESCRIPTION

Figure 1:
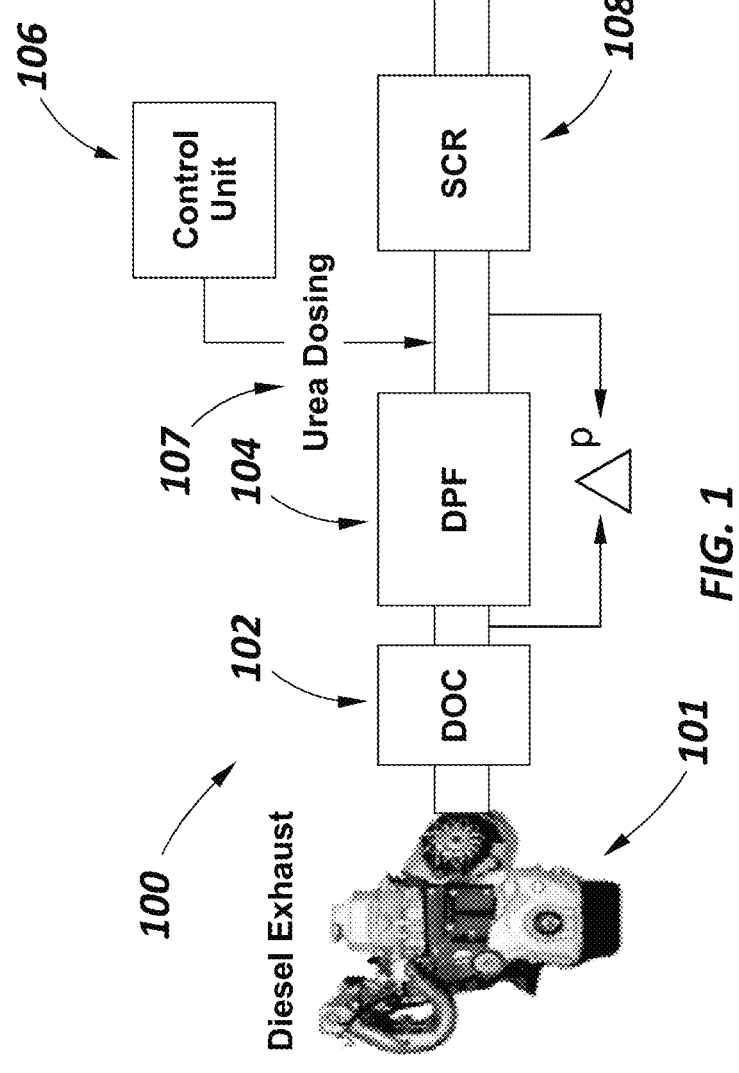
FIG. 1 is schematic diagram of a diesel exhaust system of a diesel engine.

The following description with reference to the accompanying drawings is provided to assist in a comprehensive understanding of example implementations of systems and methods for detecting and quantifying regeneration in a diesel particulate filter configured to trap particulates in engine exhaust gas. It is to be understood that the implementations described below are examples and that this disclosure is not intended to limit the invention to any example described below.

In example implementations, the engine management system or engine control unit or other engine control system in a diesel engine collects engine parameters indicative of engine operation, where the parameters include sensor readings or calculations based on the readings. Such parameters may include for example the differential pressure across the diesel particulate filter ("DPF"), the exhaust temperature, the mass flow rate, engine load, throttle, vehicle speed, and any other relevant parameters. A DPF diagnostic system may analyze the parameters, and based on at least the DPF differential pressure, the DPF input temperature, and exhaust gas mass flow rate, the system determines if a regeneration event is in process.

Regeneration events may come about passively, or as result of current driving conditions. The diesel engine may be operating at a sufficient engine load to bring the DPF input temperature to a level sufficient to burn the soot in the DPF. Regeneration events may also be triggered, or initiated manually or automatically. For example, an active regeneration may be initiated by the engine management system 202 based on differential pressure, soot load, or predetermined time periods as recommended by the original equipment manufacturer (OEM) of the diesel engine. The diesel vehicle may also be equipped with a switch to allow a user to selectively initiate a regeneration, typically when parked. When the user switches to regeneration, the engine is revved to increase the exhaust temperature to a level sufficient to burn soot. The regeneration may also be initiated by a technician or mechanic in response to engine performance issues or scheduled maintenance.

In normal operation, the engine management system 202 may input pressure measurements from a pressure sensor positioned before the DPF where the exhaust enters the DPF and from a second pressure sensor positioned after the DPF where exhaust is exiting the DPF. A differential pressure may be calculated by subtracting the second pressure sensor reading from the first pressure sensor reading. Differential pressure readings may be stored at regular time intervals and cached in a system memory for the engine management system 202. When a regeneration is detected, at least one of the last differential pressure readings sensed before the regeneration is detected may be stored as a pre-event differential pressure. Differential pressures may be stored as the regeneration event proceeds and then once the regeneration event terminates, at least one of the differential pressure readings is stored as a post-event differential pressure.

The pre-event differential pressure and post-event differential pressure are used to determine a soot burn quality value by subtracting the post-event differential pressure from the pre-event differential pressure. It is expected that the pre-event differential pressure will be higher than the post-event differential pressure since a cleaner DPF would result in a smoother flow through of exhaust through the DPF yielding a lower differential pressure. The pre-event and post-event differential pressure difference is divided by the pre-event differential pressure to arrive at a value that should be between 0 and 1. The result is a value between 0 and 1 and for purposes of convenience expressed as a percentage. The soot burn quality value may be used as an indication of the extent to which the regeneration event yielded a significant amount of burnt soot. The DPF would then be expected to operate more efficiently from then on since the DPF contains less soot obstructing the flow of exhaust through the DPF.

The soot burn quality value may also be used to score or evaluate the soot burn as good, medium, or bad soot qualities based on selected thresholds for each score. The soot burn score may also be used to report a major or minor issue based on the post-event differential pressure measured in the regeneration event. If the soot burn score is a bad soot burn or medium soot burn, a major issue alert may be reported if the post-event differential pressure is greater than a predetermined threshold. If the soot burn score is a bad soot burn, and the post-event differential pressure is between a predetermined low pressure and the predetermined high-pressure threshold, a minor issue alert may be reported. The alerts may be used as indicators to the user that the DPF is degrading in effectiveness over time. This enables a tracking of the DPF effectiveness before a diagnostic trouble code ("DTC") is generated. The DTC code typically requires more significant intervention than a better-quality soot burn. Such intervention may be more costly and may include replacement of the DPF.

The soot burn quality may be calculated each time a regeneration event is performed. A soot burn quality may also be calculated for passive regeneration events as well as active regeneration events. Each regeneration event may yield a regeneration data set comprising a soot burn quality value, the pre-event differential pressure, the post-event differential pressure, engine load, engine speed, exhaust temperature, a soot burn score, an alert based on the soot burn score, a time stamp including date and time, a mass flow rate, and any other parameter or data point deemed relevant to further evaluation of the regeneration event.

The regeneration data sets may be used over time to record a history of the changing effectiveness of the DPF. Another measure of regenerations over time that may be calculated and maintained is a soot load. The soot load is calculated by storing the pre-event and post-event differential pressure drop value (pre-event differential pressure– post-event differential pressure) from when the DPF is clean, such as when the diesel engine is new. This is stored as the clean state DPF pressure drop. As regeneration events are detected over time, the soot load is calculated as the difference between the clean state DPF pressure drop and each pre-event and post-event differential pressure drop measured in real time at each regeneration. The soot load is effectively a measure of the extent to which a soot load that can't be burned off remains and increases over time.

Example implementations of systems and methods for detecting and quantifying regeneration events are described below with reference to FIGS. 1 through 12. The description below is not intended to limit the systems and methods to the examples described below. Modifications, alternative implementations, and revisions to the examples below may be made to the examples without departing from the scope of the systems and methods.

FIG. 1 is a schematic diagram illustrating an example of a diesel engine exhaust system 100. The system 100 includes a diesel engine 101, a diesel oxidation catalyst ("DOC") 102, a diesel particulate filter ("DPF") 104, a control unit (or engine management system, engine control unit, etc.) 106, and a selective catalytic reduction unit ("SCR") 108. The DOC 102 converts carbon monoxide ("CO") and hydrocarbons into carbon dioxide ("$CO_2$") and water. The DPF 104 as already mentioned filters soot from the exhaust hydrocarbon and water gas entering from the DOC 102. The filtered exhaust gas exits the DPF 104 and flows to the SCR 108 before being emitted into the environment. The SCR 108 reduces the amount of nitrogen oxides that are to be emitted. The control unit 106 may add a urea dosing 107 to the exhaust gas entering the SCR 108 to increase the effectiveness of the SCR 107.

A pressure sensor may be mounted before the DPF 104 between the DOC 102 and the DPF 104 to measure the pressure of the exhaust gas entering the DPF 104. A second pressure sensor may be mounted between the DPF 104 and the SCR 108 to measure the pressure of the exhaust gas exiting the DPF 104. The difference between the pressure measured at the first pressure sensor and the pressure measured at the second pressure sensor is the differential pressure across the DPF 104 at a given time.

Figure 2:
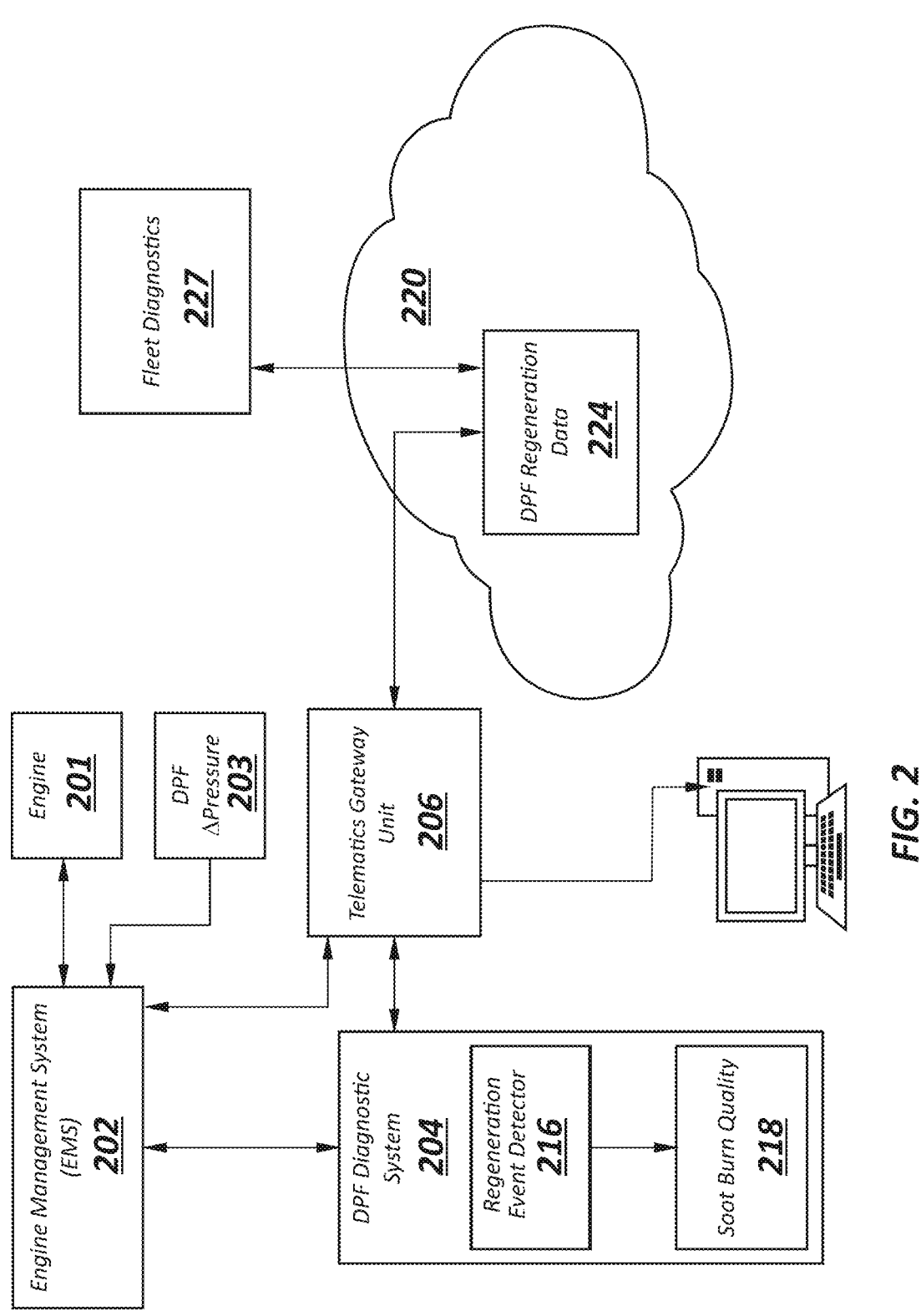
FIG. 2 is a block diagram of a system for detecting and quantifying regeneration events in a diesel exhaust system.

FIG. 2 is a schematic diagram illustrating an example of a system for detecting and quantifying regeneration in a diesel particulate filter configured to trap particulates in engine exhaust gas. As is known in the art, various performance characteristics may be monitored using sensors mounted on and around the engine 201. The sensors detect different modalities and provide measurements used by an engine management system 102 to calculate various performance parameters. Such sensors may include as examples, sensors for determining long-term and short-term fuel trims, engine load, engine speed, data from oxygen sensors, mass flow air sensors, manifold absolute pressure sensor, fuel pressure sensor, injector flow rate sensor and others that may be relevant to diagnosing fuel injectors.

In an example implementation, the system includes a DPF diagnostic system 204 configured to communicate and exchange information with the engine management system 202. The engine management system 202 may receive differential pressure measurements of the differential pressure across the DPF 104 (in FIG. 1) from pressure sensors at 203. The differential pressure measurements may then be communicated to the DPF diagnostic system 204.

Information exchange may be direct, or via a telematics gateway unit 206. The telematics gateway unit 206 may also provide access to cloud-based data 220. The DPF diagnostic system 104 may include a regeneration event detector 216 and a soot burn quality evaluator 218. The regeneration event detector 216 may receive engine parameters including, but not limited to, differential pressure across the diesel particulate filter (DPF differential pressure), exhaust temperature, and mass flow rate. The regeneration event detector 216 may use the engine parameters to determine if the diesel engine is in a regeneration event as described in more detail below with reference to FIGS. 4 and 5. In detecting the regeneration event, differential pressures are collected before and after the event. The differential pressures are used to determine a soot burn quality for the regeneration event by the soot burn quality evaluator 218 as described in more detail below.

Soot burn quality scores may be determined, and alerts generated and communicated to a user interface device 226. The user interface device 226 may also generate reports as tables or graphs to communicate soot burn quality for sequences of soot burns over time, fuel loss, and other information based on the regeneration history of the DPF.

The regeneration quality data may be communicated to a DPF regeneration data storage 224, which may be implemented in a cloud-based storage system 220. The regeneration quality data may include soot burn quality scores, alerts, identified issues, differential pressures sampled for the regeneration events, time stamps, and other types of data associated with the regeneration events. The regeneration quality data may provide a history of regeneration events and a quantification of each regeneration event, which may be used to draw conclusions about the status of the subject DPF. The regeneration history data and the information to be gleaned from each regeneration data set may be reported to the user in a variety of formats.

Figure 3:
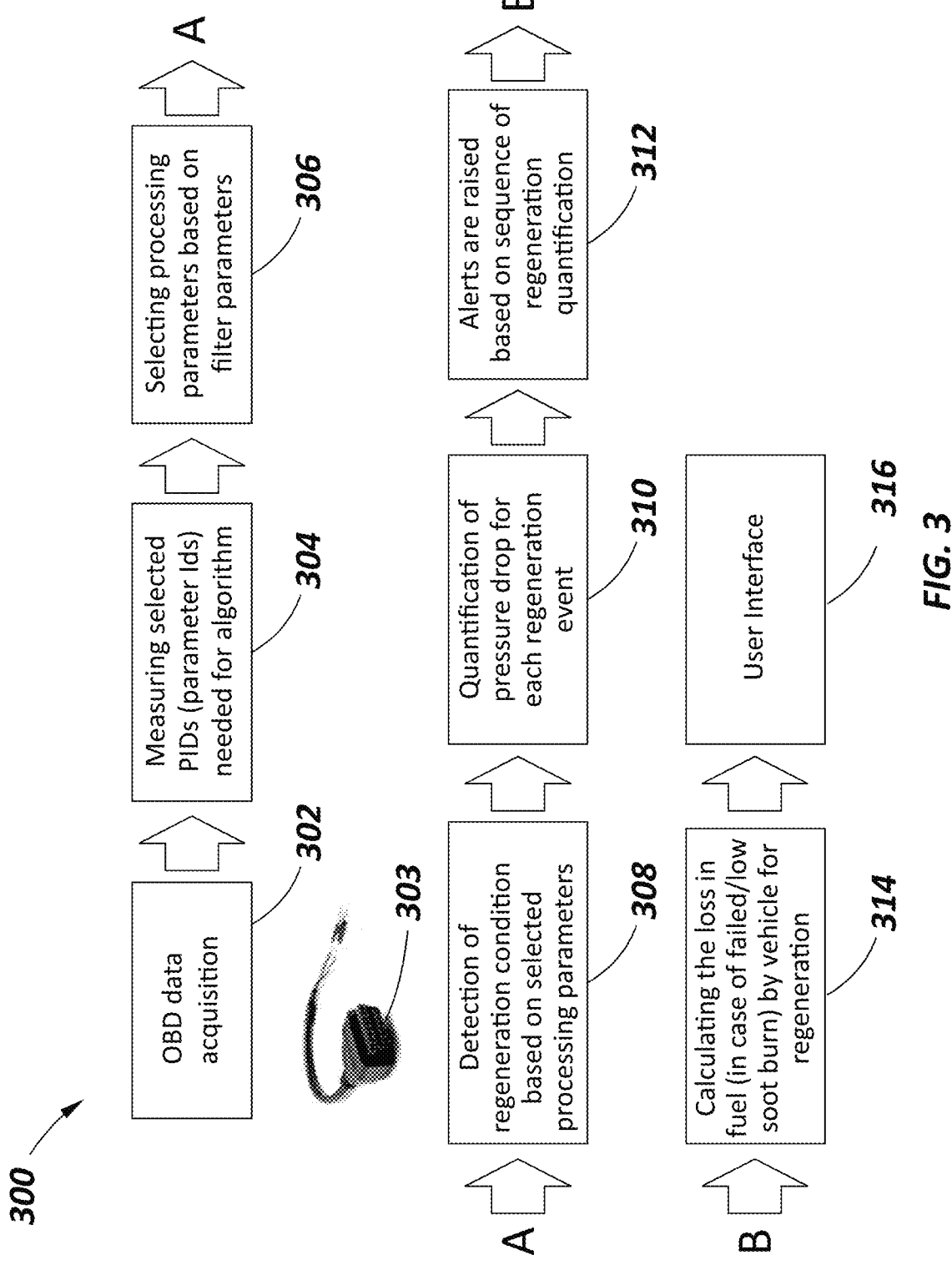
FIG. 3 is a flow chart illustrating a work flow for detecting or initiating a regeneration event and quantifying the event.

FIG. 3 is a flow chart illustrating a workflow 300 for detecting or initiating a regeneration event and quantifying the event. In normal operation, the engine management system 202 (in FIG. 2) performs acquisition of data for on-board diagnostics ("OBD") at 302. This data may be collected from a variety of sensors distributed throughout the diesel engine assembly. An OBD port 303 may connect to the engine management system 202 to allow a technician to tap into the vehicle computer system for the purpose of running diagnostics and other tests. A OBD port 303 may be an alternative data interface to receive engine parameters for detecting and quantifying the regeneration events when a forced regeneration is performed by a technician in a shop, for example.

While collecting engine data, the engine management system 202 may measure and collect filter parameters and processing parameters for detecting and quantifying regeneration events at 304. These parameters are known as parameter identifiers, or PIDs. Filter parameters may include engine speed (RPM), engine load, throttle position (percentage of travel, and vehicle speed. The processing parameters may include DPF differential pressure, DPF input temperature, and exhaust gas mass flow rate. At 306, processing parameters are selected based on the values of the filter parameters. For example, for an engine speed of about 1000 to 1700 RPM, an engine load greater than about 50%. a throttle position greater than about 50%, and a vehicle speed greater than about 50 mph, the engine management system may collect processing parameters for performing a detection and quantification of a regeneration event. Examples of such processing parameters are listed above. Other parameters may be included.

At 308, a regeneration event is detected based on the processing parameters selected at 306. Examples of methods for detecting regeneration events are described below with reference to FIGS. 4 and 5.

At 310, the pressure drop for each regeneration event is quantified. In one example, the post-event differential pressure drop is subtracted from the pre-event differential pressure drop, and the difference is divided by the pre-event differential pressure drop to provide a soot burn quality value. The soot burn quality value may be compared to thresholds to obtain qualitative soot burn scores.

At 312, alerts are raised according to user-specified logic for obtaining information about the quality of regeneration events over time. The alerts may be labeled as major or minor depending on the user specified logic. Examples are described in more detail below.

At 314, the loss of fuel during regeneration may be calculated for low or failed soot burns. An example implementation is described below. At 316, reports may be generated on a user interface, which may include a display screen, a printer, or any other suitable device. The output may include reports on individual regeneration events or on the regeneration history of the DPF.

FIG. 4 is a flow chart illustrating operation of an example method for detecting and quantifying a regeneration event. It is noted that any reference to hardware in performing any of the illustrated steps shall refer to hardware depicted or described with reference to FIG. 2.

At step 402, the engine management system extracts PIDs from OBD data packets and data storage where necessary. PIDs that are extracted include engine RPM, throttle position, and engine load. At decision block 404, these parameters are compared with selected thresholds as described above at 306 with reference to FIG. 3. If at decision block 404 the selected filter parameters are at suitable levels for a regeneration event (decision=Yes), then at step 408, DPF differential pressures, input exhaust gas temperatures, and gas flow rates are collected and may be time-stamped. If at decision block 404, the processing parameters are not optimal for a regeneration event, the data is discarded at step 406.

At decision block 410, the DPF differential pressures, the input exhaust temperatures, and gas flow rates are checked to determine if a regeneration event is detected. In general, a certain temperature level greater than a threshold temperature, a DPF differential pressure greater than a threshold pressure drop, and a gas flow rate greater than a flow threshold indicate that a regeneration event has started. In the event a regeneration event is detected in decision block 410, the Yes path is taken to step 414. In the event a regeneration event is not detected, the No path is taken to step 412 where a good health status is indicated for the DPF.

It is noted that during the regeneration event, one or more differential pressures logged before the detection of the regeneration event are stored as the pre-event differential pressure. In one example, N DPF differential pressure samples are averaged, and the average is stored as the pre-event differential pressure. While the regeneration event is proceeding, DPF differential pressures are logged and the processing parameters (e.g. input temperature) continue to be monitored to determine if the DPF regeneration event has concluded. One or more differential pressures may be stored as the post-event differential pressure after the regeneration event has concluded. In an example, N PDF differential pressure samples collected after the end of the regeneration event are averaged. The average DPF differential pressure is stored as the post-event differential pressure.

At step 414, a soot burn quality value is determined as a function of the pre-event differential pressure and the post-event differential pressure. In one example, the soot burn quality=[(pre-event differential pressure−post-event differential pressure)/pre-event differential pressure]×100%. The higher the drop in DPF differential pressure (pre-event differential pressure much greater than post-event differential pressure) the higher the quality of the soot burn, and the higher the soot burn quality value. The soot burn quality may be further evaluated in the context of the actual pre-event and post-event differential pressure drops to evaluate the regeneration event quality of the regeneration event. If it is determined that the regeneration was of low quality or failed, the fuel consumed is indicated as a fuel loss. At step 416, the soot burn quality is further evaluated in the context of the pre-event and post-event differential pressure drops to identify any major or minor issues to which the user may need to be evaluated.

Figure 5:
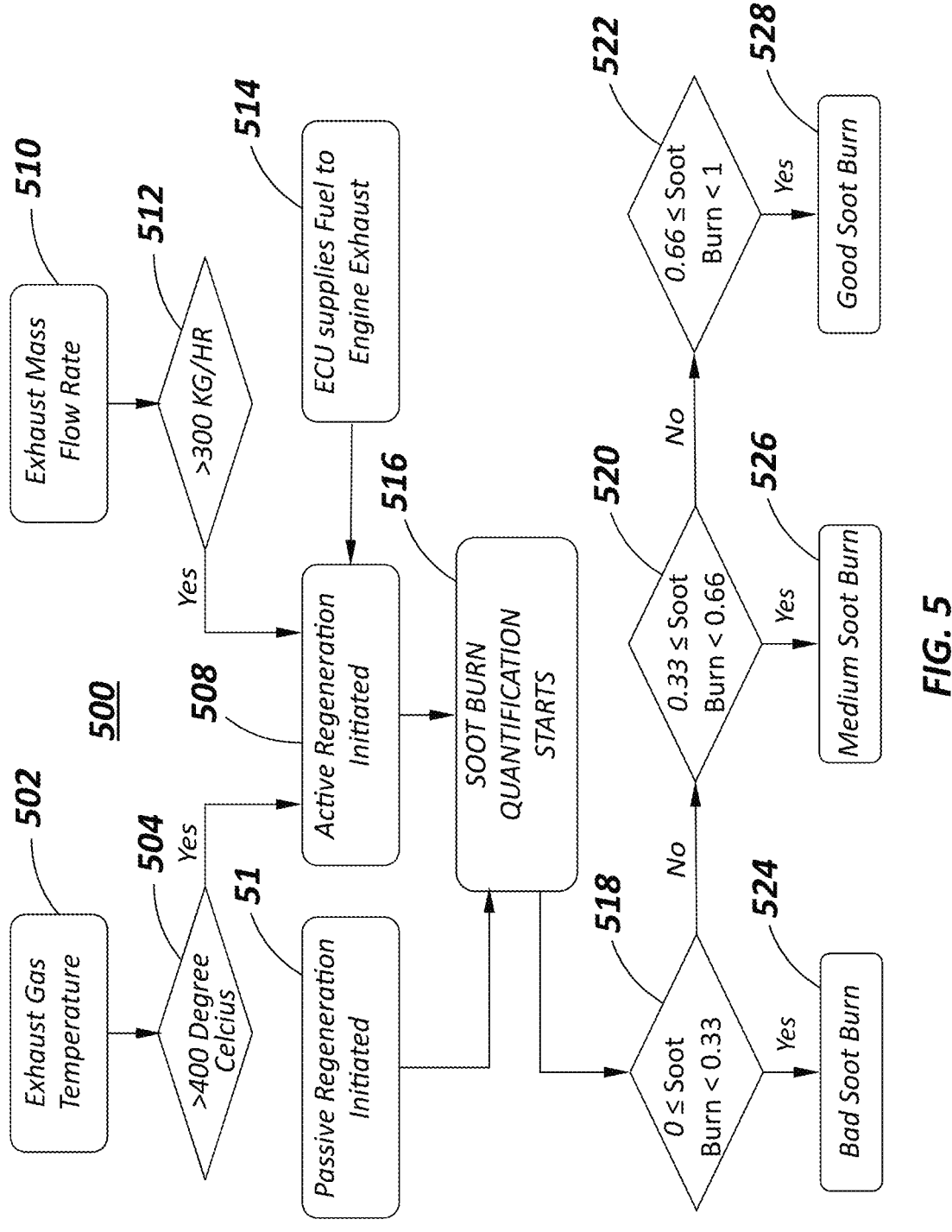
FIG. 5 is a flow chart illustrating operation of another example method for detecting and quantifying a regeneration event.

FIG. 5 is a flow chart 500 illustrating operation of another example method for detecting and quantifying a regeneration event. The method 500 in FIG. 5 begins with the assumption that the filter parameter thresholds have been met as described at decision block 404 in FIG. 4. At step 502, the exhaust gas temperature is checked and if at decision block 504, the temperature is greater than 400 deg. C., regeneration conditions are detected. In addition, at step 510 the mass flow rate is checked and if greater than 300 Kg/Hr., regeneration conditions are detected at decision block 512. At step 508, an active regeneration is initiated.

At step 506, a passive regeneration may be initiated under appropriate operating conditions. At step 516, the soot burn quantification starts. DPF differential pressures are logged. A pre-event differential pressure and a post-event differential pressure are determined and the soot burn quality is calculated as described above with reference to FIG. 4. The soot burn quality value is checked. At decision block 518, if the soot burn quality value is between 0 and 0.33, the soot burn is deemed to be a bad soot burn at step 524. At decision block 520, if the soot burn quality value is between 0.33 and 0.66, the soot burn is deemed to be a medium soot burn at step 526. At decision block 522, if the soot burn quality value is between 0.66 and 1, the soot burn is deemed to be a good soot burn at step 528.

It is noted that the values indicated in the flowchart 500 in FIG. 5 are provided as examples. Different values may be used in different implementations.

Figure 6:
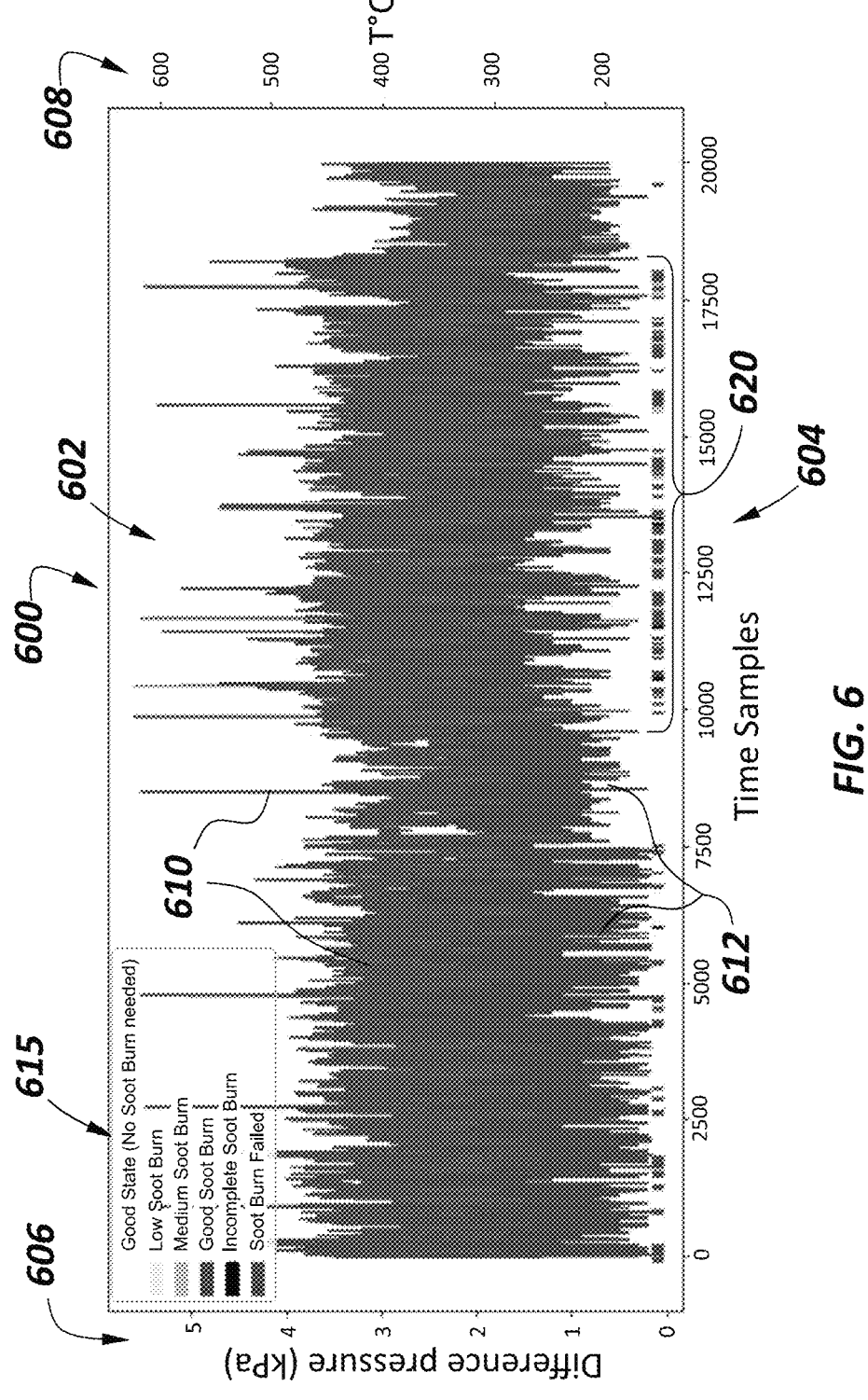
FIG. 6 is a graph showing examples of soot burn results over time plotted against differential pressure and temperatures at each time.

FIG. 6 is a graph showing examples of soot burn results 602 over time 604 plotted against differential pressure 606 and temperatures 608 at each time sample. Each soot burn result 602 is shown by a DPF differential pressure value 610 in grey and by an exhaust temperature at 612 in black at the time sample at which the measurements were taken. The soot burn quality may be scored as described in FIG. 5 according to the legend 615 for the graph in FIG. 6. The legend may refer to marks 620 corresponding to each regeneration event recorded at the corresponding time sample. The graph in FIG. 6 provides a summary of how the regeneration events have been scored and a comparison between the different regeneration events performed at different temperatures and yielding different DPF pressures.

Figure 7:
FIG. 7 is an example of a fleet report showing soot burn quantification results for diesel engines in a fleet of diesel engine operated vehicles.

FIG. 7 is an example of a fleet report 700 showing the status of vehicles in a fleet and issues they may have. The report 700 includes a vehicle list 702, which lists vehicles with issues and provides an alert 705 for any major issues that the vehicles may have. The issues may be of any type of performance issues and may be identified by DCT codes that may be read from each vehicle. The report 700 includes detailed alerts for soot burn quantification results 704 using systems and methods disclosed herein.

Figure 8A:
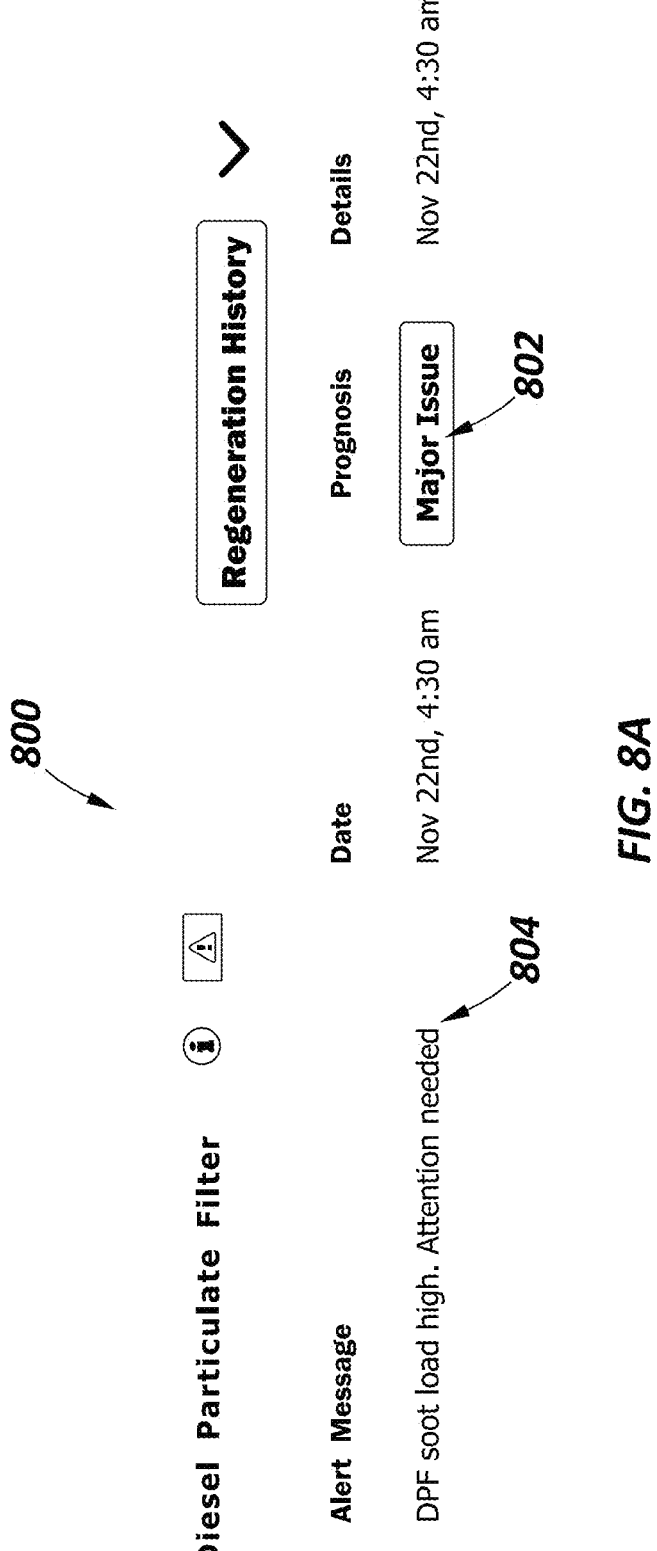
FIG. 8A is an example of an alert based on quantification of a regeneration event.
Figure 8B:
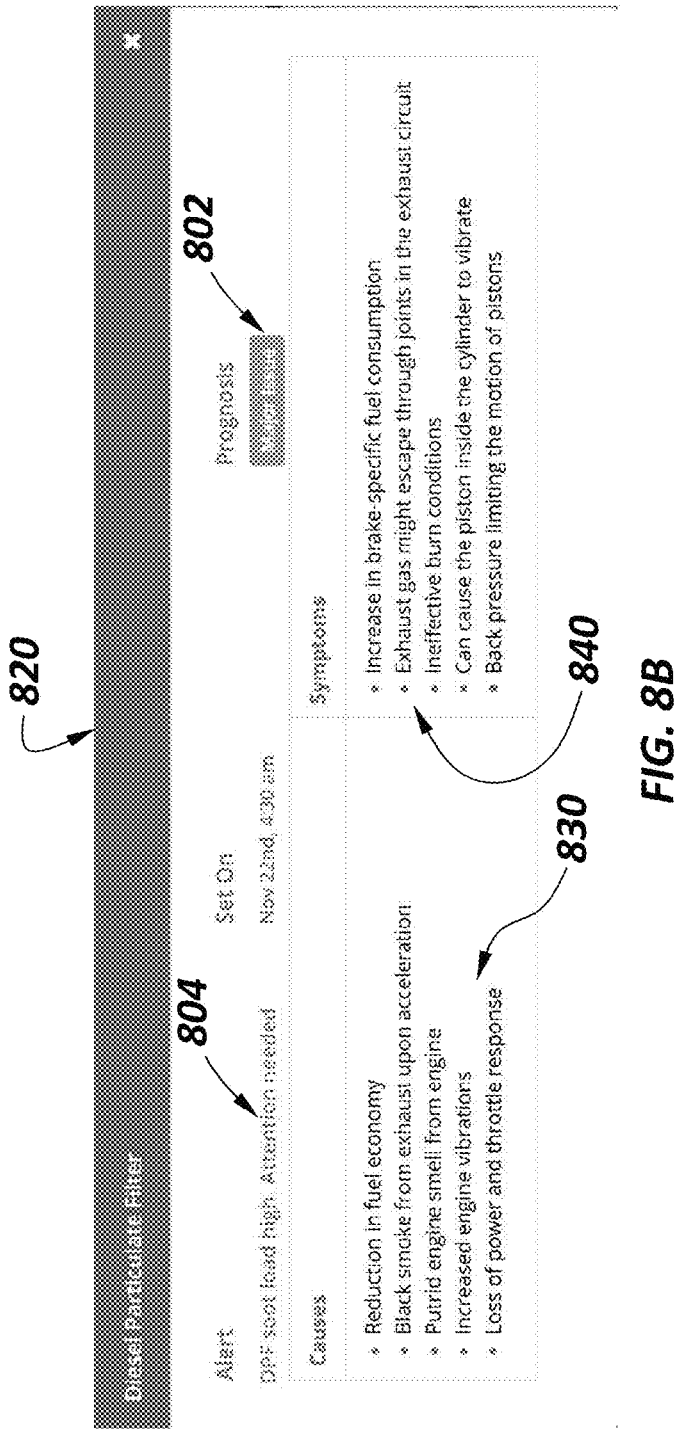
FIG. 8B is an example of the alert shown in FIG. 8A further listing causes and symptoms of the conditions identified in the alert.

FIG. 8A is an example of an alert report 800 that may be displayed on a user interface based on quantification of a regeneration event. The alert report 800 includes an alert 802 and an alert message 804, which may be derived using the methods described with reference to FIGS. 4 and 5. FIG. 8B is an example of the alert report 802 shown in FIG. 8A further listing causes 830 and symptoms 840 of the conditions identified in the alert.

Figure 9:
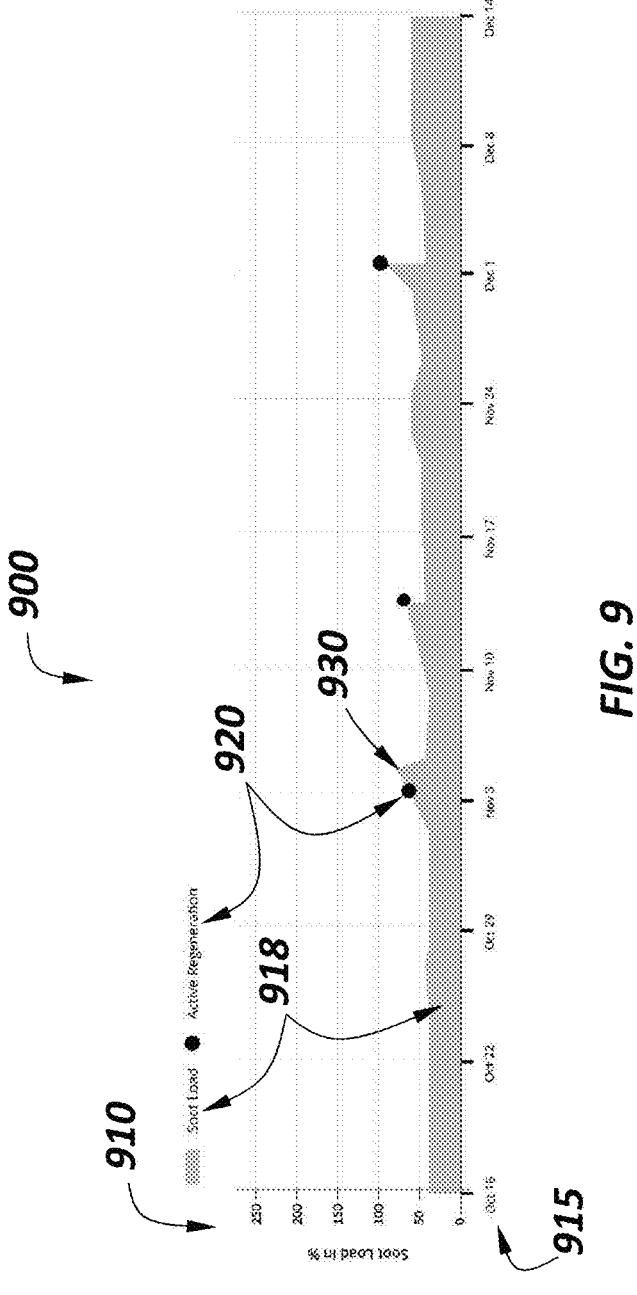
FIG. 9 is an example soot load history illustrating the effectiveness of the soot burns over a time period and the extent to which the soot load increases over time.

FIG. 9 is an example soot load history 900 illustrating the effectiveness of the soot burns over a time period and the extent to which the soot load increases over time. The soot load history 900 shows a soot load percentage 910 at times over a date range 915. The soot load may be calculated during regeneration events by subtracting a clean DPF differential pressure (described above) from DPF differential pressures measured in real-time, then dividing by the clean differential pressure. As the diesel engine is used over time 915, the soot load 918 is expected to rise. At certain dates, the soot load 918 rises towards a peak 930. The history 900 in FIG. 9 depicts the initiation of active regenerations 920 to reduce the soot load 918 and slow the rise in soot load values over time.

FIG. 9 illustrates how example implementations may calibrate DPF clogging past available data of the DTC. When DPF is fully clogged the DTC (Diagnostic trouble code is raised by engine control unit, example of DPF fully clogged DTC is P244B) is raised. Using the systems and methods described herein, a historical data of the DTC may be provided. This historical data may be used for determining current DPF clogging state (Compared to fully clogged i.e. DTC P244B).

To illustrate by example: An active regeneration may be started (at 920 for example) for a specific engine when differential pressure crosses 4 kpa (taken from standard engine specification). Accordingly, a DPF pressure up to 4 kpa is considered a safe zone. Active regeneration is expected to bring down pressure below 4 kpa as shown for example after peak 930 in FIG. 9.

If regeneration fails then differential pressure keep rising and at 7 kpa ECU raise trouble code P244B, which is when the vehicle stopped/break down or needs to be taken at service station.

Accordingly, 0 to 4 kpa is a safe zone and 4 kpa to 7 kpa is when DPF clogging is deteriorating and needs to be alerted. The 4 to 7 kpa pressure range may be divided into the different alert levels.

Figure 10:
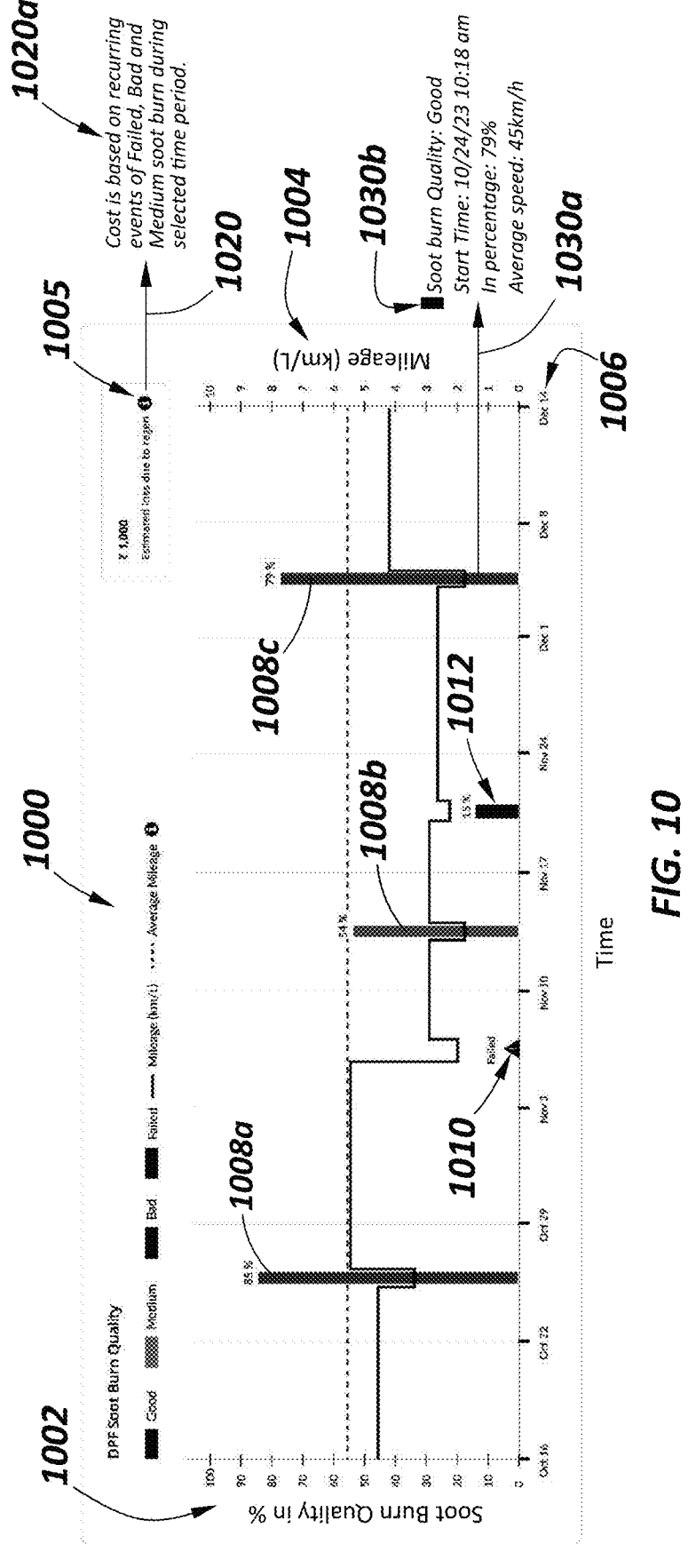
FIG. 10 is an example graphical report showing quantification of regeneration events based on soot burn quality in percentage and mileage.

FIG. 10 is an example graphical report 1000 showing quantification of regeneration events based on soot burn quality as a percentage 1002 and mileage 1004 over time 1006. The report 1000 shows regeneration events 1008 are shown at the date 1006 on which they were performed and may be color coded to reflect the soot burn score (e.g. Good, Medium, Bad, Failed). The first regeneration event 1008a and the regeneration event at 1008c had soot burn quality values deemed to be Good. A regeneration event at 1008b between the good events is deemed to be of medium quality. Before the regeneration event at 1008b is a failed regeneration event 1010. Between the regeneration event at 1008b and at 1008c is a Low quality regeneration event at 1012. If a regeneration is deemed to have failed, which is when the DPF differential pressure drop at the event is close to 0, or when the regeneration is deemed to be bad or medium based on the comparison of the DPF differential pressure drop and appropriate thresholds, then the fuel usage is determined over the time the regeneration was conducted. That fuel usage is deemed to be a fuel loss. The user may over a cursor over an information icon 1025 to obtain a pop-up that provides the fuel loss information at 1020a. For any given regeneration event 1008a-c, 1010, and 1012, the user may hover or click on the regeneration event marks to obtain details of the soot burn. In FIG. 10, a user is assumed to hover the cursor over regeneration event mark 1008c at 1030 s, which generates a pop-up message 1030b, which provides details of the soot burn.

It is understood that various attributes and elements from any one configuration can also be included in other configurations. Although the present disclosure has been described in detail with reference to certain preferred configurations thereof, other versions are possible. The actual scope of the disclosure encompasses not only the disclosed configurations, but also all equivalent ways of practicing or implementing the disclosure. The above detailed description of the configurations of the disclosure is not intended to be exhaustive or to limit the disclosure to the precise form disclosed above or to the particular field of usage mentioned in this disclosure. While specific configurations of, and examples for, the disclosure are described above for illustrative purposes, various equivalent modifications are possible within the scope of the disclosure, as those skilled in the relevant art will recognize. The elements and acts of the various configurations described above may be combined to provide further configurations. Further, the teachings of the disclosure provided herein may be applied to products and systems other than travel pillows.

The invention claimed is:

1. A system for detecting and quantifying regeneration in a diesel particulate filter configured to trap particulates in engine exhaust gas, the system comprising:

a data interface configured to receive engine data from an engine management system configured to receive a plurality of parameters from sensors that monitor the parameters indicative of engine operation, where the parameters include differential pressure across the diesel particulate filter ("DPF"), exhaust temperature, and mass flow rate;

a diesel particulate filter diagnostic system ("DPF diagnostic system") stored as computer programs in a memory system; and a processor configured to execute the computer programs of the DPF diagnostic system, where when executed the DPF diagnostic system:

receives and stores a plurality of DPF differential pressure measurements, engine speed, and engine load read by the engine management system periodically at predetermined sampling intervals during engine operation;

detects a regeneration event by continuously monitoring when the exhaust temperature exceeds a regeneration temperature threshold of 500° C. and the mass flow rate exceeds a regeneration gas flow threshold of 300 kg/hr, where at least one DPF differential pressure measurement stored before detection of the regeneration event is stored as a pre-event differential pressure;

stores at least one DPF differential pressure measurement received after completion of the regeneration event as a post-event differential pressure;

calculates a soot burn quality=[(pre-event differential pressure−post-event differential pressure)/pre-event differential pressure]×100% to quantify actual soot removal efficiency during the regeneration event;

scores the soot burn quality based on predetermined threshold levels where a bad soot burn is less than 33%, a medium soot burn is 33% to 66%, and a good soot burn is greater than 66%; and automatically controls engine operating parameters by outputting a DPF status based on the score to the engine management system to trigger corrective actions including initiating addition regenerating cycles when the soot burn quality indicates poor DPF performance.

2. The system of claim 1 where the scoring of the soot burn quality includes determining:

a bad soot burn for a soot burn quality <33%, a medium soot burn for a soot burn quality >=33% and <66%, AND a good soot burn for a soot burn quality >=66%.

3. The system of claim 1 where the DPF diagnostic system:

generates an alert indicative of the soot burn quality, and where the soot burn quality and post-event differential pressure are evaluated to generate an alert as a major or a minor issue.

4. The system of claim 2 where:

when the bad soot burn quality is bad soot burn or medium soot burn, a major issue alert is generated when the post-event differential pressure is greater than a HIGH POST-EVENT DIFFERENTIAL PRESSURE THRESHOLD; and when the soot burn quality is bad soot burn, and the post-event differential pressure is between a LOW POST-EVENT DIFFERENTIAL PRESSURE THRESHOLD and the HIGH POST-EVENT DIFFERENTIAL PRESSURE THRESHOLD, a minor issue alert is generated.

5. The system of claim 1 where in detecting the regeneration event, the DPF diagnostic system:

determines a passive event time during which the regeneration temperature exceeds 500° C. and mass flow rate exceeds 300 kg/hr, which are indicative of the regeneration event; and stores the pre-event differential pressure and the post-event differential pressure for the regeneration event when the passive event time is greater than a predetermined regeneration event threshold time.

6. The system of claim 1 where the DPF diagnostic system:

stores for each regeneration event a regeneration event data set comprising:

the differential pressure, the soot burn quality, the soot burn score, and the exhaust temperature during the regeneration event;

stores a regeneration event sequence comprising the regeneration event data sets for each regeneration event in a time period, where each regeneration event data set is time-stamped.

7. The system of claim 1 where the DPF diagnostic system:

stores a clean state differential pressure determined in a clean regeneration event when the DPF is in a known clean state; and calculating a soot burn load for each regeneration event by subtracting the differential pressure calculated at each regeneration event from the clean state differential pressure.

8. The system of claim 1 where the DPF diagnostic system:

compares the pre-event differential pressure−the post-event differential pressure to a VALID EVENT THRESHOLD; and indicates a failed regeneration when the pre-event differential pressure−the post-event differential pressure is less than the VALID EVENT THRESHOLD.

9. The system of claim 1 where the DPF diagnostic system:

calculates a pre-event fuel consumption before the regeneration event;

calculates a fuel consumption during the regeneration event; and indicates the fuel consumption during regeneration as a fuel loss when the DPF diagnostic system indicates a failed regeneration, or indicates the fuel consumption as a fuel efficiency improvement when the DPF diagnostic system does not indicate a failed regeneration.

10. A method of detecting and quantifying regeneration in a diesel particulate filter comprising:

receiving from an engine management system over a data interface a plurality of DPF differential pressure measurements, engine speed, and engine load read by the engine management system periodically at predetermined sampling intervals during engine operation, and storing the plurality of DPF differential pressure measurements, engine speed, and engine load in a data storage;

detecting, using a processor, a regeneration event by continuously monitoring when the exhaust temperature exceeds a regeneration temperature of 500° C. and the mass flow rate exceeds a regeneration gas flow threshold of 300 kg/hr, where at least one DPF differential pressure measurement stored before detection of the regeneration event is stored as a pre-event differential pressure;

storing, in the data storage system, at least one DPF differential pressure measurement received after completion of the regeneration event as a post-event differential pressure;

calculating, using the processor, a differential pressure by subtracting the post-event differential pressure from the pre-event differential pressure;

calculating a soot burn quality=[(pre-event differential pressure−post-event differential pressure)/pre-event differential pressure]×100% to quantify actual soot removal efficiency during the regeneration event;

scoring the soot burn quality based on predetermined threshold levels where a bad soot burn is less than 33%, a medium soot burn is 33% to 66% od soot burn is greater than 66%; and automatically controlling engine operating parameters by outputting a DPF status based on the score to the engine management system to trigger corrective actions including initiating additional regeneration cycles when the soot burn quality indicates poor DPF performance.

11. The method of claim 10 where the scoring of the soot burn quality includes determining:

scoring a bad soot burn for a soot burn quality <33%, scoring a medium soot burn for a soot burn quality >=33% and <66%, AND scoring a good soot burn for a soot burn quality >=66%.

12. The method of claim 10 where the step of outputting the DPF status includes:

generating an alert indicative of the soot burn quality.

13. The method of claim 11 further comprising:

evaluating the soot burn quality and post-event differential pressure to generate an alert as a major or a minor issue.

14. The method of claim 13 further comprising:

generating a major issue alert when the bad soot burn quality is bad soot burn or medium soot burn, and when the post-event differential pressure is greater than a HIGH POST-EVENT DIFFERENTIAL PRESSURE THRESHOLD; and generating a minor issue alert when the soot burn quality is bad soot burn, and the post-event differential pressure is between a LOW POST-EVENT DIFFERENTIAL PRESSURE THRESHOLD and the HIGH POST-EVENT DIFFERENTIAL PRESSURE THRESHOLD.

15. The method of claim 10 where in detecting the regeneration event, the DPF diagnostic system:

14 determines a passive event time during which the regeneration temperature exceeds 500° C. and mass flow rate exceeds 300 kg/hr are indicative of the regeneration event; and stores the pre-event differential pressure and the post-event differential pressure for the regeneration event when the passive event time is greater than a predetermined regeneration event threshold time.

16. The method of claim 10 comprising:

storing for each regeneration event a regeneration event data set comprising:

the differential pressure, the soot burn quality, the soot burn score, and the exhaust temperature during the regeneration event;

storing a regeneration event sequence comprising the regeneration event data sets for each regeneration event in a time period, where each regeneration event data set is time-stamped.

17. The method of claim 10 comprising:

storing a clean state differential pressure determined in a clean regeneration event when the DPF is in a known clean state; and calculating a soot burn load for each regeneration event by subtracting the differential pressure calculated at each regeneration event from the clean state differential pressure.

18. The method of claim 10 comprising:

comparing the pre-event differential pressure−the post-event differential pressure to a VALID EVENT THRESHOLD; and indicating a failed regeneration when the pre-event differential pressure−the post-event differential pressure is less than the VALID EVENT THRESHOLD.

19. The method of claim 18 comprising:

calculating a pre-event fuel consumption before the regeneration event;

calculating a fuel consumption during the regeneration event; and indicating the fuel consumption during regeneration as a fuel loss when the DPF diagnostic system indicates a failed regeneration, or indicating the fuel consumption as a fuel efficiency improvement when the DPF diagnostic system does not indicate a failed regeneration.

20. The method of claim 10 comprising:

quantifying a quality measure of the regeneration quantification by evaluating the differential pressure pre-regeneration and the differential pressure post-regeneration, where a larger drop in differential pressure is indicated as good regeneration and a smaller drop in differential pressure is indicated as a bad regeneration;

identifying a failed regeneration event when an insignificant drop in differential pressure is measured and other parameters indicate a regeneration event where the exhaust temperature exceeds 500° C. and the mass flow rate exceeds 300 kg/hr;

evaluating fuel efficiency after the regeneration event by:

reporting a fuel efficiency loss when the regeneration event is identified as failed regeneration event with soot bum quality smaller than 33%;

reporting a fuel efficiency improvement when a good regeneration event is identified with soot burn quality greater than 66%;

mapping the sequence of regeneration quantification and change in the fuel efficiency to a DTC event relating to the DPF indicated by the engine management system;

anticipating a DPF clogging before the DTC event is generated by analyzing the mapping of the sequence of regeneration quantification and change in fuel efficiency and automatically triggering corrective engine control actions to prevent DPF failure;

indicating an alert before the DPF clogging;

displaying at least one suggested action to avoid the DPF clogging; and simultaneously providing a fuel efficiency reduction due to a current clogging state of the DPF.

\* \* \* \* \*